United States Patent [19]

Biddle

[11] 4,026,437
[45] May 31, 1977

[54] SEED DRILL

[75] Inventor: Howard William Biddle, Histon, England

[73] Assignee: Cambridge Consultants Ltd., Cambridge, England

[22] Filed: Nov. 17, 1975

[21] Appl. No.: 632,623

[30] Foreign Application Priority Data

Nov. 22, 1974 United Kingdom ............. 50664/74
June 3, 1975 United Kingdom ............. 23908/75

[52] U.S. Cl. .................................. 221/211; 111/77; 302/25
[51] Int. Cl.² ......................................... B65H 3/08
[58] Field of Search .......... 221/211, 278, 265, 193, 221/224, 336, 337, 225; 222/394, 335, 376; 302/51, 29, 25; 111/77; 214/1 BE

[56] References Cited

UNITED STATES PATENTS

| 1,637,834 | 8/1927 | Oliver | 222/211 |
| 2,183,606 | 12/1939 | Day | 221/211 |
| 3,156,201 | 11/1964 | Tweedale | 221/211 |
| 3,387,746 | 6/1968 | Whipper | 221/211 |
| 3,482,735 | 12/1969 | Goulter | 221/211 |

Primary Examiner—Drayton E. Hoffman
Assistant Examiner—H. Grant Skaggs

[57] ABSTRACT

An apparatus for metering and transporting particulate material, particularly seeds, in which suction is continuously applied to holes in a surface of a drum to enable the particles to be picked up by the drum, an air pressure device being provided to produce an air stream for entraining and accelerating the particles along a transport passage away from the drum surface.

11 Claims, 2 Drawing Figures

U.S. Patent

May 31, 1977

4,026,437

SEED DRILL

This invention relates to apparatus for metering and transporting particulate material and is particularly applicable to metering seeds and transporting them to a seed drill coulter for delivery at desired locations.

An object of the present invention is to provide such an apparatus in simple and convenient form.

According to the invention, apparatus for transporting and metering particulate material comprises a rotary drum having one or more suction holes in a surface thereof to which, in use, suction is continuously applied to enable particles to be picked up by the holes, and means disposed externally of the drum for producing an air stream to accelerate the particles away from the drum surface along a transport passage.

Preferably, a rotary element is provided having a resiliently deformable outer peripheral surface which is disposed adjacent to or engaging a surface of the drum.

The suction holes may conveniently be arranged in one or more peripherally extending rows, each row being disposed within a peripheral groove in the drum surface.

Figure 1:
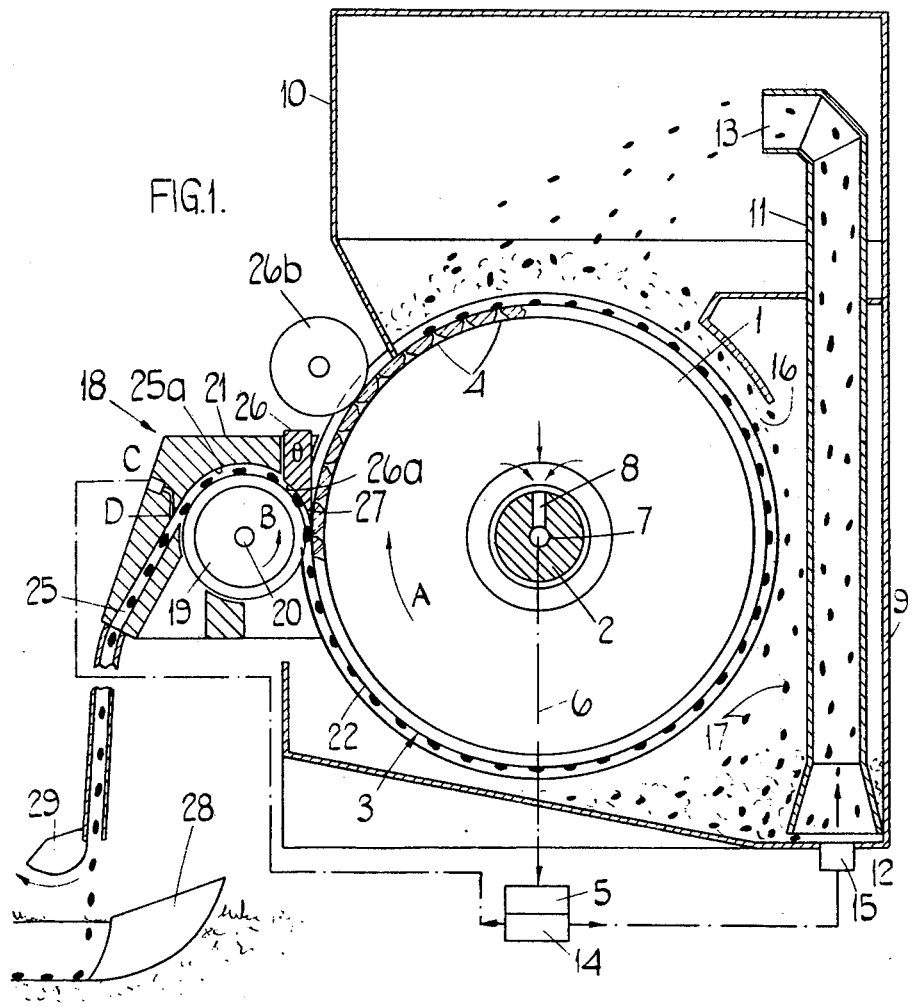
Figure 2:
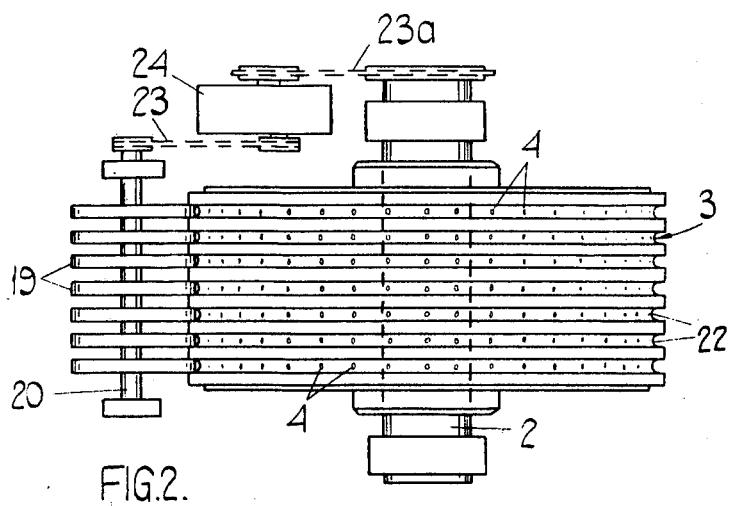

The invention will now be described, by way of example, with reference to the accompanying drawings in which:

FIG. 1 is a diagrammatic representation of one form of the apparatus of the invention, and FIG. 2 is a plan view to a larger scale of part of the apparatus of FIG. 1.

Referring to the drawings, these show the apparatus of the invention in a form particularly suitable for the transportation of seeds and comprising a rotary drum 1, mounted for rotation on a fixed horizontal shaft 2 and having in its outer surface a plurality of parallel peripheral grooves 3, in the base of each of which open a plurality of suction holes or apertures 4 equi-angularly spaced about the drum centre. Means are provided to maintain the interior of the drum continuously at a pressure below atmospheric pressure by a pump 5 connected by a line 6 to an axial circuit drilling 7 of the shaft which communicates with the drum interior via one or more radial drillings 8. A suction effect is thus obtained at the holes 4.

Seed to be handled by the apparatus to supplied to a main container 9, from which it is raised to a feed hopper 10 by one or more pneumatic transport tubes 11, the lower flared end portion 12 of which is normally located near or below the surface of the material in the main container and the upper end portion 13 of which extends into the feed hopper 10. Air under pressure is introduced from a pump 14 through a tube 15 to provide a transporting air stream in the tube 11.

The feed hopper 10 is mounted vertically above the drum 1 and has an elongate outlet orifice 16 extending over a portion of the drum outer surface. The lower seeds in the hopper 10 are thus resting on the drum surface under the weight of the upper seeds, so that when the drum rotates in the direction indicated by the arrow A, friction between the seeds and the drum surface tends to accelerate the seeds towards the peripheral speed of the drum, which facilitates reliable pickup of individual seeds by the holes 4 under the action of the applied suction. Surplus seeds 17, which have not been picked up by holes 4, fall into the main container 9, whence they are recirculated to the feed hopper 10 by the tube 11. Husks and chaff which are inevitably present, together with seeds, in the main hopper 10, are separated from the seeds at their exit from the tube 11, since the relatively heavy seeds tend to fall into the hopper 10 and the relatively light husks and chaff tend to be carried away by the exhausting air. To facilitate this, the top of the hopper is of wire mesh or other open work material.

Seeds picked up by the apertures 4 are conveyed by the drum to an extraction mechanism designated generally at 18. The extraction mechanism includes a row of wheels 19, rotatably mounted on a shaft 20 housed in the body 21 of the extractor and having a resilient outer surface formed by a layer of rubber or the like. The wheels extend into the respective grooves 3 with their resilient outer surfaces bearing against the bases 22 of the grooves 3. The wheels 19 are driven by a chain or the like 23, from an appropriate mechanism 24 which also drives the drum 1 via a chain 23a. The drive is arranged so that the peripheral speeds of the drum and the wheels is substantially the same. In practice the motive power is derived from one or more land wheels, which may be on a tractor carrying the apparatus, and which provide a seed feed rate which varies with the speed of the apparatus relative to the ground. The wheels are driven in the direction indicated by the arrow B and acts as a separating device which permits only one seed at a time to be extracted from the drum and fed into transport passages 25, only one of which is illustrated formed in the body 21. In the case of relatively elongate seeds such as barley and oats, the wheels also have the effect of tilting the front edges of the seeds out of the vacuum holes to facilitate their entry into the passages 25. The seeds are extracted from the moving drum surface at the entry to the transport passages 25 by respective extraction elements 26 extending into the groove 3 so as to lie in close proximity to the bases of the grooves. Each element 26 is tapered to provide a thin extraction edge 27 which lifts the seeds from the hole 4. A portion of each element 26 has an arcuate surface 26a which, together with the surface of the associated wheel 19 forms part of an initial curved portion 25a of the corresponding transport passage. The elements 26 are adjustable for different seed or particle sizes. Brushes 26b are arranged to wipe the interiors of the grooves to prevent blockage thereof. The brushes rotate in the same direction as the drum so that their contacting surfaces move in opposite directions to provide a rubbing action.

High pressure air is supplied from the pump 14 to the transport passages 25 at the location indicated by the arrow C and this produces a pressure gradient in that portion of the passages 25 lying between the air entry locations D and the drum surface. The pump 14 and the lines leading to the locations D thus provide a means to produce an air stream to accelerate the particles away from the drum. The seeds are thus sucked along these passage portions as far as the location D, at which point the seeds are entrained in the streams of high pressure air entering at C and accelerated to a high velocity for delivery to seed drills (not shown) each formed by a coulter 28. The seeds are separated from the air streams at the delivery ends of the transport passages by means of elements 29 which are shaped and arranged to produce a coanda effect tending to deflect the air around their surfaces and leave the seeds to fall into the seed drills.

It will be seen that, by arranging the holes 4 within the grooves 3, the holes are associated with three moving boundaries which enhance the frictional effect between the drum and the seeds and this improves acceleration of the seeds leaving the hopper 10 and also assists in minimising multiple seed pick-up. The use of grooves also acts to orientate elongate seeds such as barley and oats along the grooves and this improves alignment of such seeds with the transport passage.

It is desirable, for economic reasons, to use the narrowest possible transport passage, consistent with the maximum size of seed to be transported, since this minimises the air flow for a given pressure. It has been found that the entry of seeds to a narrow passage can be facilitated by causing the seeds to travel around the curved passage portion partially defined by the outer surfaces of the wheels as shown so that centrifugal force causes the seeds to travel along the radially outer wall of the passage and they are thus caused to travel down a narrowly defined path. The optimum passage size has been found to be approximately twice the average seed dimension. When conservation of air is not a major consideration a relatively large outlet passage may be used and the curved portion dispensed with if desired.

As an alternative to pneumatic recirculation between the main and feed hoppers, it is possible to use mechanical recirculation means such as an auger.

I claim:

1. Apparatus for metering and transporting particulate material comprising a hopper for said material, a rotary drum having through apertures in a surface thereof, means for maintaining an uninterrupted pressure difference across said apertures during operation of the apparatus to enable particles to be picked up by the apertures from said hopper, at least one resilient rotary element co-operating with the drum surface to control the passage of particles at a location in which they leave the drum, a transport passage extending away from said drum surface adjacent said location, and means disposed externally of the drum operable to produce an air stream to accelerate the particles away from the drum surface along said transport passage.

2. Apparatus according to claim 1 wherein the air stream is produced by means introducing a flow of air into the transport passage at a position spaced from the drum surface, so that a pressure gradient prevails in the portion of the passage between the drum surface and said position, said gradient tending to urge particles away from said surface.

3. Apparatus according to claim 2 wherein an extractor is provided adjacent to the drum surface and acts to dislodge particles from the surface for introduction into the air stream.

4. Apparatus according to claim 3 wherein the extractor has a tapered portion, the apex of which is close to the drum surface.

5. Apparatus according to claim 4 wherein one side of the tapered portion of the extractor is arcuate and closely follows a portion of the external surface of the rotary element.

6. Apparatus according to claim 1 wherein said surface of the drum is peripheral and said feed hopper for containing said material is arranged to direct particles of the material onto an upper area of the drum surface such that friction permits the drum rotational movement to accelerate the particles up to the speed of the drum for pick-up by the apertures.

7. Apparatus according to claim 1 wherein a plurality of drum apertures are arranged in one or more rows, each row being disposed within a peripheral groove in the drum surface.

8. Apparatus according to claim 1 wherein a plurality of drum apertures are arranged in at least one row, each row being disposed within a peripheral groove in the drum surface and a rotary resilient element is provided for each groove and engages the apertured surface of its groove.

9. Apparatus according to claim 8 wherein a respective brush is arranged to wipe the interior of each groove.

10. Apparatus according to claim 1 further comprising a main material container, disposed below said hopper, means operable to supply material to the hopper pneumatically from said container, surplus material from the hopper and drum surface being returned directly to the container by gravity.

11. Apparatus according to claim 1 wherein the transport passage extends to a delivery location and is associated with an element which is shaped and arranged to produce a coanda effect to separate the air stream leaving the passage and the entrained particles, but permits the particles to continue substantially along their direction of travel.

* * * * *